US012367605B2

(12) United States Patent
Tenkawa et al.

(10) Patent No.: US 12,367,605 B2
(45) Date of Patent: Jul. 22, 2025

(54) IMAGE PROCESSING APPARATUS, CONTROL METHOD THEREOF, AND IMAGE CAPTURING APPARATUS

(71) Applicant: CANON KABUSHIKI KAISHA, Tokyo (JP)

(72) Inventors: Tomoyuki Tenkawa, Chiba (JP); Kotaro Yano, Tokyo (JP); Kenshi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 17/897,340

(22) Filed: Aug. 29, 2022

(65) Prior Publication Data
US 2023/0065506 A1 Mar. 2, 2023

(30) Foreign Application Priority Data

Sep. 1, 2021 (JP) .................. 2021-142699

(51) Int. Cl.
*G06K 9/00* (2022.01)
*G06T 7/20* (2017.01)
(Continued)

(52) U.S. Cl.
CPC .................. *G06T 7/70* (2017.01); *G06T 7/20* (2013.01); *G06V 10/25* (2022.01); *G06V 10/761* (2022.01);
(Continued)

(58) Field of Classification Search
CPC ..... G06T 7/11; G06T 7/10; G06T 7/12; G06T 7/13; G06T 7/215; G06T 7/20;
(Continued)

(56) References Cited

U.S. PATENT DOCUMENTS 9,691,155 B2 6/2017 Tojo et al.
9,773,322 B2 9/2017 Uchiyama et al.
(Continued)

FOREIGN PATENT DOCUMENTS

CN 112714253 A 4/2021
EP 2631778 A2 8/2013
(Continued)

OTHER PUBLICATIONS

Ross Girshick et al., "Rich Feature Hierarchies for Accurate Object Detection and Semantic Segmentation" IEEE Conference on Computer Vision and Pattern Recognition (Oct. 2014) pp. 1-21.
(Continued)

*Primary Examiner* — Avinash Yentrapati
(74) *Attorney, Agent, or Firm* — Carter, DeLuca & Farrell LLP

(57) ABSTRACT

An image processing apparatus comprises: an image input unit configured to input an image; a detection unit configured to detect an object from the image; an accepting unit configured to accept an input of a locus to the image, a selection unit configured to select, based on a locus region decided by the locus, at least two objects included in a plurality of objects detected by the detection unit; and an integration unit configured to generate an integration region that integrates at least two regions in the image corresponding to the at least two objects selected by the selection unit and set the integration region as a region of interest in the image.

10 Claims, 16 Drawing Sheets

(51) Int. Cl.
  *G06T 7/70* (2017.01)
  *G06V 10/25* (2022.01)
  *G06V 10/74* (2022.01)
  *G06V 10/771* (2022.01)

(52) U.S. Cl.
  CPC ........ *G06V 10/771* (2022.01); *G06V 2201/07* (2022.01)

(58) Field of Classification Search
  CPC ......... G06T 7/223; G06T 7/231; G06T 7/238; G06T 7/246; A61B 2034/2065; G06V 2201/07; G08B 13/19606; G08B 13/19608
  See application file for complete search history.

(56) References Cited

U.S. PATENT DOCUMENTS

| | | | |
|---|---|---|---|
| 10,140,726 | B2 | 11/2018 | Nishino et al. |
| 10,346,465 | B2 * | 7/2019 | Gao ...................... G06F 3/0488 |
| 10,438,361 | B2 | 10/2019 | Tojo et al. |
| 11,095,814 | B2 | 8/2021 | Makita et al. |
| 2020/0265495 | A1 * | 8/2020 | Cho ..................... G06F 16/5854 |
| 2021/0365707 | A1 * | 11/2021 | Mao ....................... G06V 20/46 |

FOREIGN PATENT DOCUMENTS

| | | |
|---|---|---|
| JP | 4849163 B2 | 1/2012 |
| JP | 6397454 B2 | 9/2018 |
| JP | 2019-126091 A | 7/2019 |
| JP | 2020-021250 A | 2/2020 |
| WO | 2021/145071 A1 | 7/2021 |

OTHER PUBLICATIONS

Wei Liu et al., "SSD: Single Shot MultiBox Detector" Computer Vision-ECCV (Dec. 2016) pp. 1-17.

Joseph Redmon et al., "You Only Look Once: Unified, Real-Time Object Detection" IEEE Conference on Computer Vision and Pattern Recognition (May 2016) pp. 779-788.

Notice of Reasons for Refusal issued by the Japanese Patent Office on May 19, 2025 in corresponding JP Patent Application No. 2021-142699, with English translation.

* cited by examiner

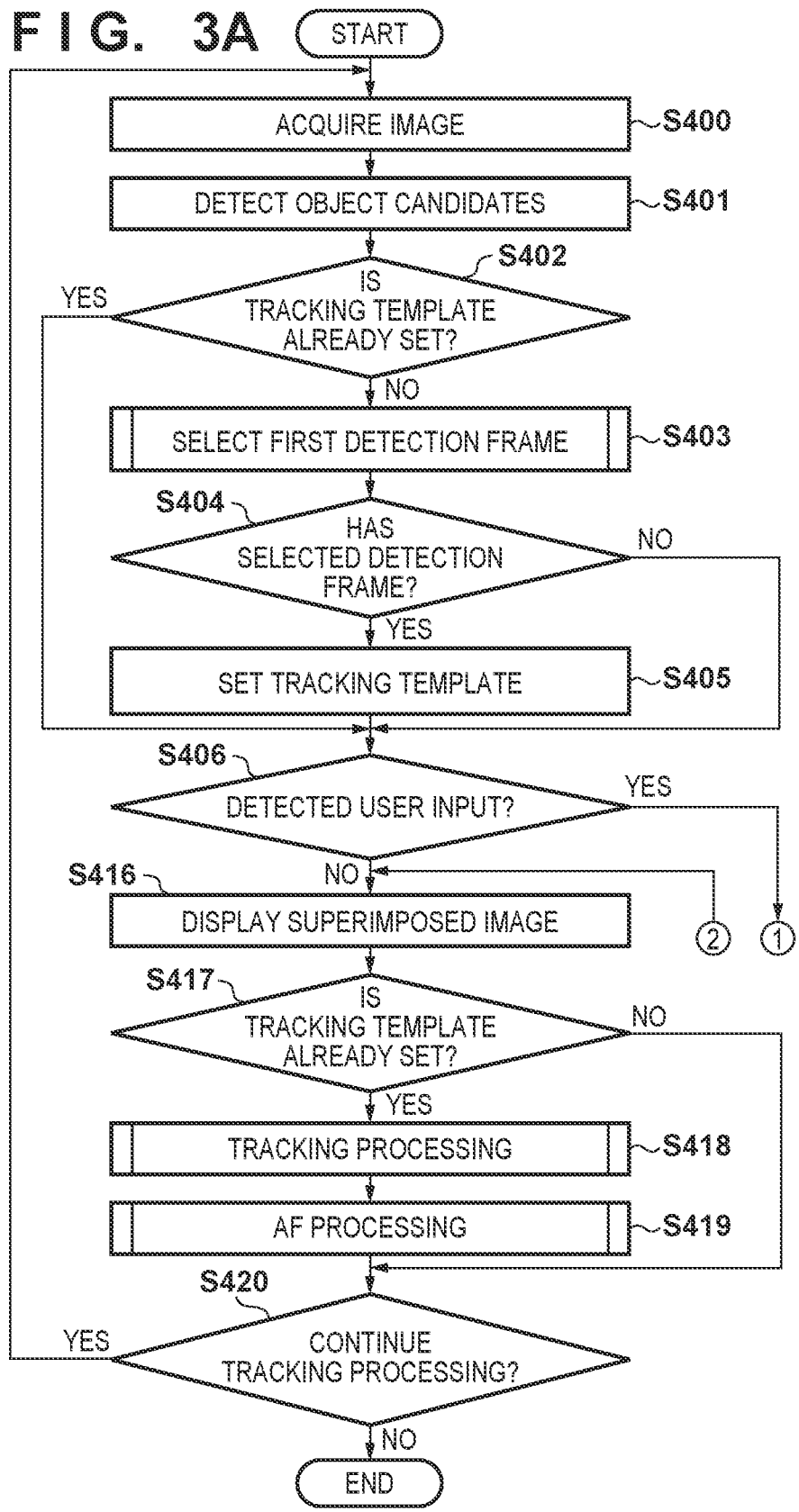

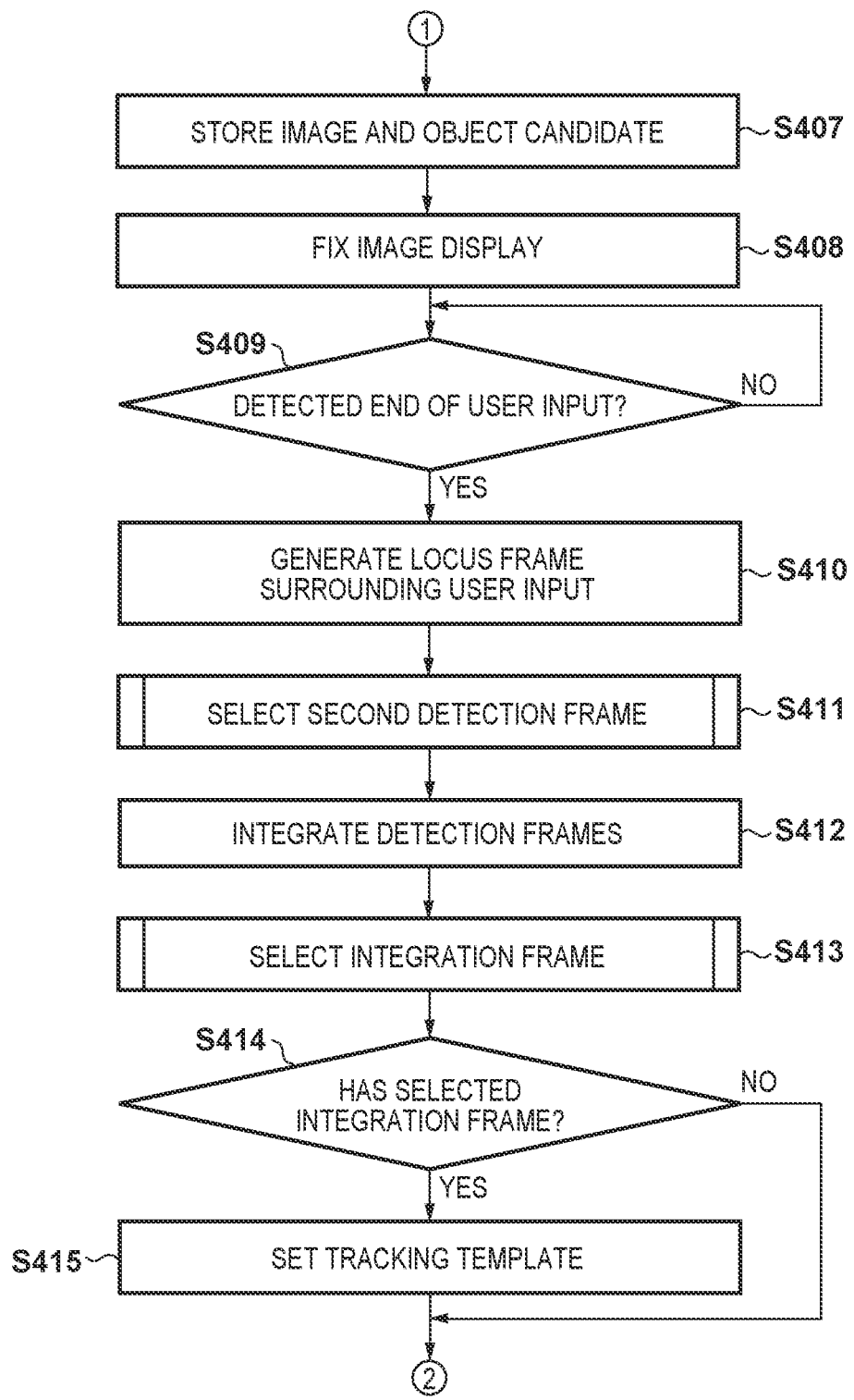

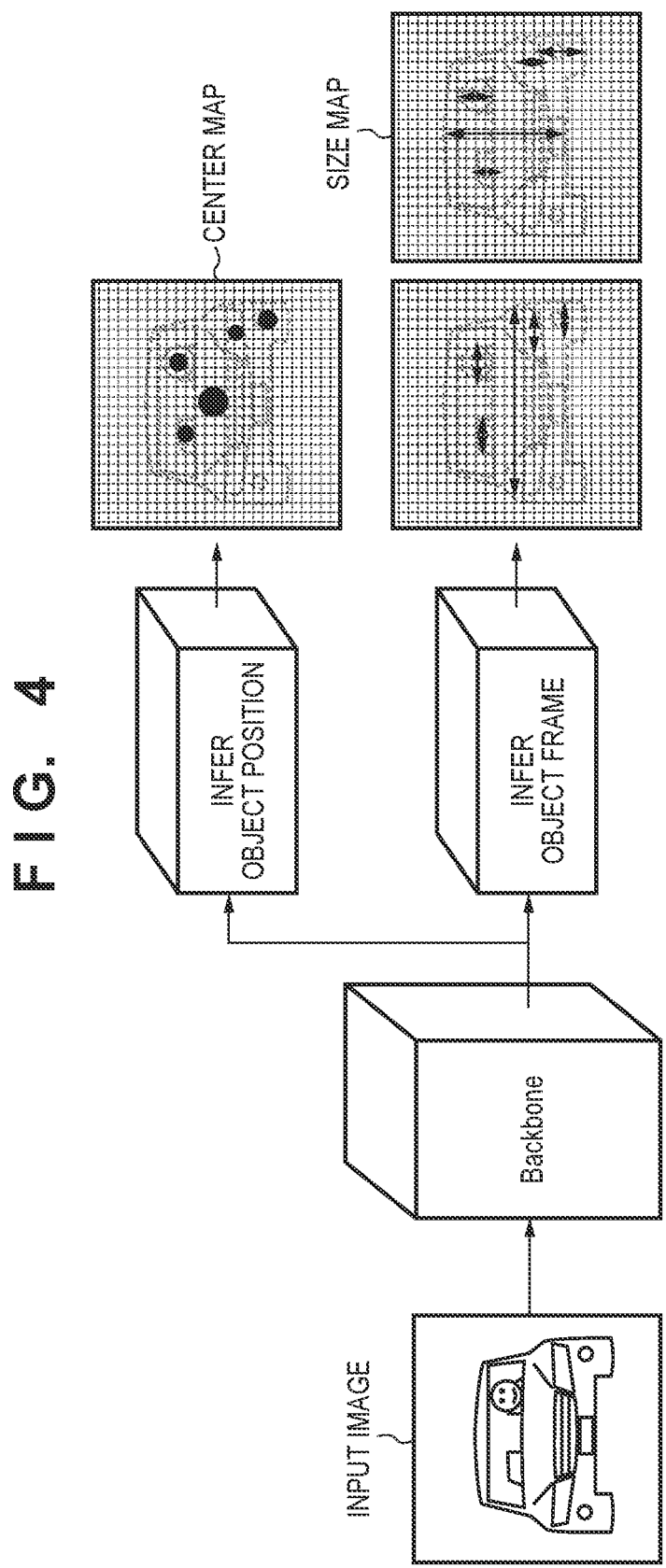

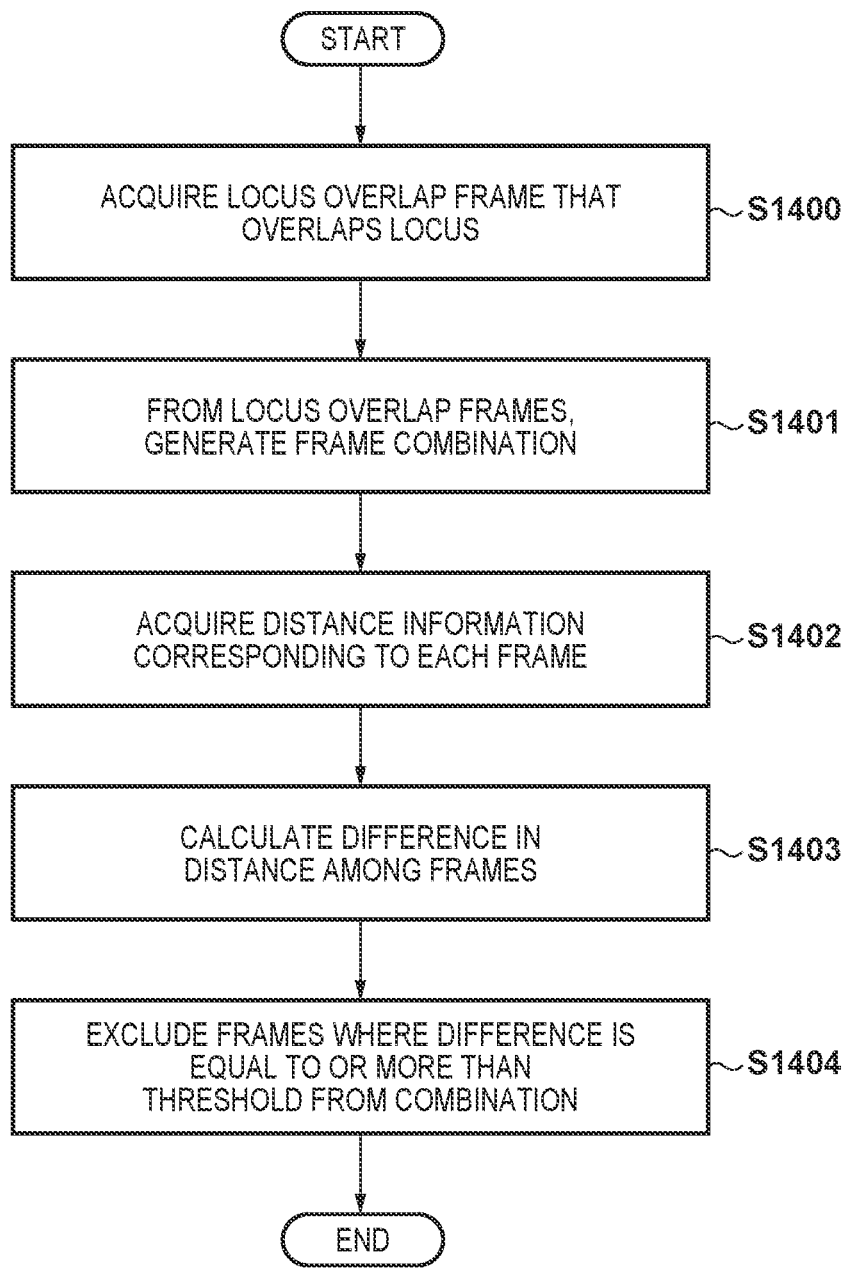

IMAGE PROCESSING APPARATUS, CONTROL METHOD THEREOF, AND IMAGE CAPTURING APPARATUS

BACKGROUND OF THE INVENTION

Field of the Invention

The present invention relates to a technique of setting a region of interest (ROI) in an image.

Description of the Related Art

A current camera has a function of detecting an object region with a specific feature from an image and automatically deciding exposure and a focal distance such that image capturing is appropriately performed. There is also known a camera having a tracking function of continuously tracking an object region selected in advance even in subsequent frames, thereby continuously adjusting focus, brightness, and colors. Since these functions are executed using the information of a region of interest where an object exists in an input image, the region of interest needs to be appropriately set.

To extract the information of the region of interest of an object from an input image, a technique of detecting a target object is necessary. For example, a technique of detecting a target object of a specific category such as a face or a face organ (a pupil, a nose, or a mouth) of a person, or a whole body of a person is used. In recent years, along with development of deep learning, a technique of detecting an arbitrary object such as an animal or a vehicle by learning using information of objects of various categories has been implemented. Examples are the following non-patent literatures (NPLs).

NPL1: Ross Girshick et al., "Rich Feature Hierarchies for Accurate Object Detection and Semantic Segmentation.", 2014 IEEE Conference on Computer Vision and Pattern Recognition NPL2: Wei Liu et al., "SSD: Single Shot MultiBox Detector", Computer Vision-ECCV 2016

NPL3: Joseph Redmon et al., "You Only Look Once: Unified, Real-Time Object Detection", 2016 IEEE Conference on Computer Vision and Pattern Recognition On the other hand, if a region of interest is automatically set using the above-described detection technique, an object that a user does not intend may be set as the tracking target region. From this viewpoint, there has been proposed a method of correcting a region of interest by a user operation. For example, Japanese Patent No. 6397454 (patent literature 1) discloses a method of switching a tracking target to a specific object based on a touch operation of a user.

If a region of interest is automatically set using the above-described detection technique, a partial region of an object that a user intends may be set as the region of interest. If tracking processing is executed using the partial region as the region of interest, the region can hardly be discriminated from remaining regions in the image. This may lead to a wrong result and miss the object. However, patent literature 1 only describes the technique of switching the object and cannot cope with this problem.

SUMMARY OF THE INVENTION

According to one aspect of the present invention, an image processing apparatus comprises: an image input unit configured to input an image; a detection unit configured to detect an object from the image; an accepting unit configured to accept an input of a locus to the image; a selection unit configured to select, based on a locus region decided by the locus, at least two objects included in a plurality of objects detected by the detection unit: and an integration unit configured to generate an integration region that integrates at least two regions in the image corresponding to the at least two objects selected by the selection unit and set the integration region as a region of interest in the image.

The present invention enables more appropriate setting of a region of interest in an image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are flowcharts for explaining processing in the camera system at the time of image capturing;

FIG. 4 is a view for explaining the structure of a neural network;

FIG. 14 is a flowchart for explaining processing of a selection unit 270 according to the first modification:

DESCRIPTION OF THE EMBODIMENTS

Figure 1:
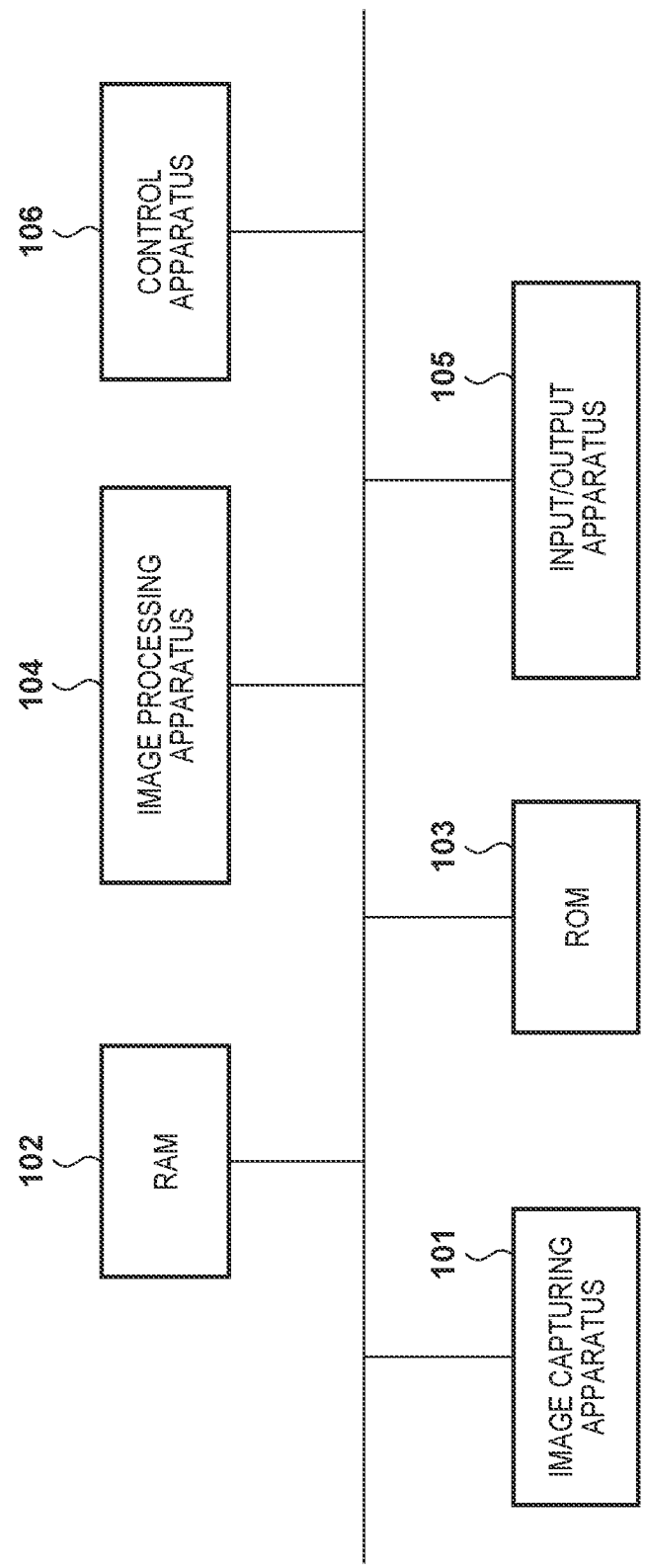
FIG. 1 is a block diagram showing the overall configuration of a camera system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As an image processing apparatus according to the first embodiment of the present invention, a camera system will be described below as an example. However, the present invention can be implemented in an arbitrary electronic equipment configured to track an object region in a moving image. Such an electronic equipment includes not only an image capturing apparatus such as a digital camera or a digital video camera, as a matter of course, but also a personal computer, a portable telephone, a drive recorder, a robot, and a drone each of which has a camera function. However, the electronic equipment is not limited to these.

<System Configuration>

FIG. 1 is a block diagram showing the overall configuration of the camera system. The camera system includes an image capturing apparatus 101, a RAM 102, a ROM 103, an image processing apparatus 104, an input/output apparatus 105, and a control apparatus 106. The units are configured to be communicable with each other and are connected by a bus or the like. Note that here, the units shown in FIG. 1 are assumed to form an integrated apparatus (camera) but may be connected via a network to form a distributed system.

The image capturing apparatus 101 is formed by an imaging lens, an image capturing element, an A/D converter, an aperture control device, and a focus control device. The imaging lens includes a fixed lens, a zoom lens, a focus lens, an aperture, and an aperture motor. The image capturing element includes a CCD or a CMOS configured to convert an optical image of an object into an electrical signal. The A/D converter converts an analog signal into a digital signal. The image capturing apparatus 101 converts an object image formed on the imaging plane of the image capturing element by the imaging lens into an electrical signal, applies, by the A/D converter, signal processing of AD conversion processing to the electrical signal, and supplies the signal as image data to the RAM 102. The aperture control device controls the operation of the aperture motor to change the opening diameter of the aperture, thereby controlling the aperture of the imaging lens. The focus control device controls the operation of a focus motor based on the phase difference between a pair of focus detection signals obtained from the image capturing element to drive the focus lens, thereby controlling the focus state of the imaging lens.

The RAM 102 stores image data obtained by the image capturing apparatus 101, or image data to be displayed on the input/output apparatus 105. The RAM 102 has a sufficient storage capacity to store a predetermined number of still images or a moving image of a predetermined time. The RAM 102 also serves as a memory (video memory) for image display, and supplies display image data to the input/output apparatus 105.

The ROM 103 is a storage device such as a magnetic storage device or a semiconductor memory, and stores programs loaded based on the operations of the image processing apparatus 104 and the control apparatus 106 and data that should be stored for a long time.

The image processing apparatus 104 detects and selects an object candidate region from an image, superimposes the image and the object candidate region, and outputs the result to the input/output apparatus 105 and the control apparatus 106. The object candidate here means a nonspecific object in various categories such as animals, vehicles, insects, and aquatic animals. In this embodiment, the image processing apparatus 104 outputs, as a detection result, the position and size of a nonspecific object candidate region and a likelihood representing an object likelihood, thereby performing object detection. Details of the configuration and operation of the image processing apparatus 104 will be described later.

The input/output apparatus 105 is an apparatus used by a camera system 100 to accept an instruction from the user or used by the user to obtain various kinds of information from the camera system 100. The input/output apparatus 105 is formed by, for example, an input device group including switches, buttons, keys, a touch panel, and the like, and a display device such as an LCD or an organic EL display. An input via the input device group is detected by the control apparatus 106 via the bus, and the control apparatus 106 controls the units to implement an operation according to the input. Also, in the input/output apparatus 105, the touch detection surface of the touch panel serves as the display surface of the display device. The touch panel can use any of touch panels of various types such as a resistive film type, an electrostatic capacitance type, and an optical sensor type. Also, the input/output apparatus 105 sequentially transfers image data and displays it, thereby displaying a live view image. The following description will be made assuming that the input/output apparatus 105 is configured as a touch display that integrates the touch panel and the display device.

The control apparatus 106 is formed by a CPU (Central Processing Unit). The control apparatus 106 executes programs stored in the ROM 103 to implement the functions of the camera system 100. In addition, the control apparatus 106 controls the image capturing apparatus 101 to perform aperture control, focus control, and exposure control. For example, the control apparatus 106 executes AE (Auto Exposure) for automatically deciding exposure conditions (a shutter speed or an accumulation time, an aperture value, and a sensitivity) based on the information of the object brightness of image data obtained by the image capturing apparatus 101. Also, using the detection result of an object region by the image processing apparatus 104, the control apparatus 106 can automatically set a focus detection region and implement a tracking AF processing function to an arbitrary object region. Furthermore, the control apparatus 106 can execute AE processing based on the brightness information of a focus detection region and perform image processing (for example, gamma correction processing or AWB (Auto White Balance) adjustment processing) based on the pixel values of the focus detection region. The control apparatus 106 also performs display control of the input/output apparatus 105. For example, the control apparatus 106 superimposes an indicator (for example, a rectangular frame surrounding a region) representing the position of a current object region on a display image.

The input/output apparatus 105 can detect the following five states (operations) on the touch panel that is an input device.

Touch down: a finger or a pen, which was not in touch with the touch panel, newly touches the touch panel (that is, a start of touch).

Touch on: a state in which the finger or pen is touching the touch panel.

Touch move: the finger or pen moves while keeping touching the touch panel.

Touch up: the finger or pen in touch with the touch panel is separated (that is, an end of touch).

Touch off: a state in which nothing is touching the touch panel.

Note that when touch down is detected, touch on is also simultaneously detected. After the touch down, normally, the touch on is continuously detected unless touch up is detected. A state in which touch move is detected is a state in which touch on is detected. Even if touch on is detected, touch move is not detected unless the touch position moves. After touch up of all fingers or pen that was in touch is detected, the state changes to touch off.

These operations/states and position coordinates at which the finger or pen is touching the touch panel are notified to the control apparatus 106 via an internal bus. Based on the notified information, the control apparatus 106 determines what kind of touch operation the user performs on the touch panel.

<Functional Configuration>

Figure 2:
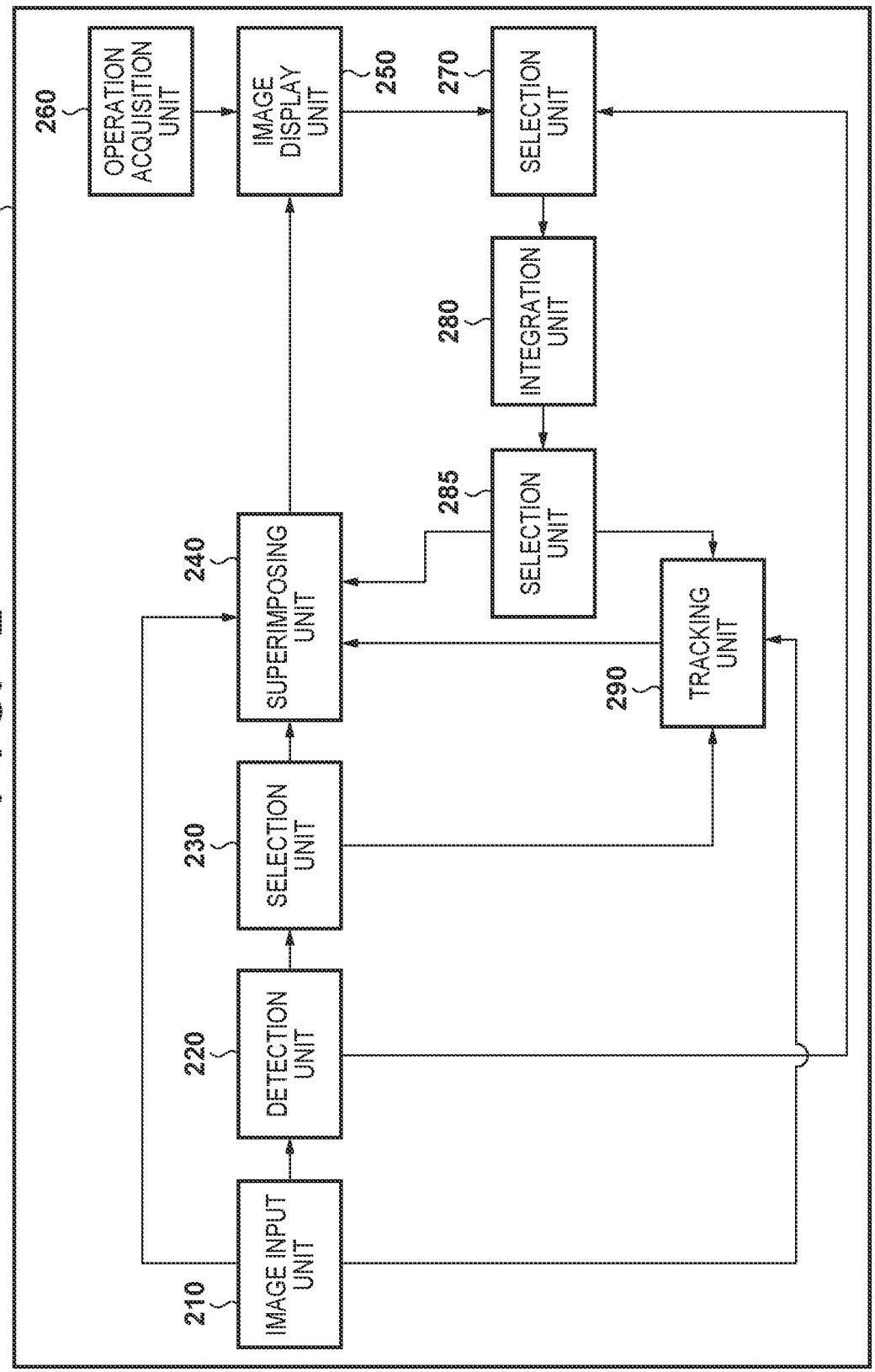
FIG. 2 is a block diagram showing the functional configuration of the camera system.

FIG. 2 is a block diagram showing the functional configuration of the camera system. Here, functions corresponding to the image processing apparatus 104, the input/output apparatus 105, and the control apparatus 106 are shown. The camera system includes an image input unit 210, a detection unit 220, a selection unit 230, a superimposition unit 240, an image display unit 250, an operation acquisition unit 260, a selection unit 270, an integration unit 280, a selection unit 285, and a tracking unit 290.

The image input unit 210 inputs, to the image processing apparatus 104, a time-series moving image captured by the image capturing apparatus 101. For example, the image input unit 210 inputs frame images that form a full HD (1920×1280 pixels) moving image in real time (60 frames/sec).

The detection unit 220 processes the image input by the image input unit 210 and detects object candidates. For example, an object candidate is detected by estimating an object detection region. As the detection region, the image coordinate values of the center of a frame, the width of the frame, the height of the frame, and a likelihood representing the likelihood of existence of an object are estimated.

The selection unit 230 selects, from the object candidates detected by the detection unit 220, one frame that has a high likelihood and is located near the image center, thereby obtaining a result of first detection frame selection. The selection unit 270 selects a combination of object candidates from the object candidates detected by the detection unit 220 and information acquired by the operation acquisition unit 260. Based on the combination of object candidates selected by the selection unit 270, the integration unit 280 integrates the object candidates. The selection unit 285 selects one integration frame from integration results obtained by the integration unit 280. Details will be described later with reference to FIGS. 3A and 3B.

The superimposition unit 240 superimposes the image input by the image input unit 210 and an object frame selected by the selection unit 230 or the selection unit 285 or an object frame that is the processing result of the tracking unit 290. The image display unit 250 displays the image superimposed by the superimposition unit 240. The operation acquisition unit 260 acquires an operation input of the user to the image displayed on the image display unit 250.

The tracking unit 290 executes tracking processing based on the image input by the image input unit 210 and the object candidate obtained by the selection unit 230 or the selection unit 285. The tracking unit 290 also outputs the object frame that is the processing result to the superimposition unit 240.

<Operation of Camera System>

FIGS. 3A and 3B are flowcharts for explaining processing in the camera system at the time of image capturing. More specifically, an operation when selecting a frame of interest from a captured moving image and executing tracking processing and AF processing in the camera system is shown. Note that the camera system need not always perform all processes to be described with reference to the flowchart.

In step S400, the image input unit 210 inputs an image from a time-series moving image captured by the image capturing apparatus 101 to the detection unit 220. The image acquired in step S400 is, for example, bitmap data expressed by RGB data each expressed by 8 bits. In step S401, the detection unit 220 processes the image input by the image input unit 210 and detects object candidates.

Figure 8A:
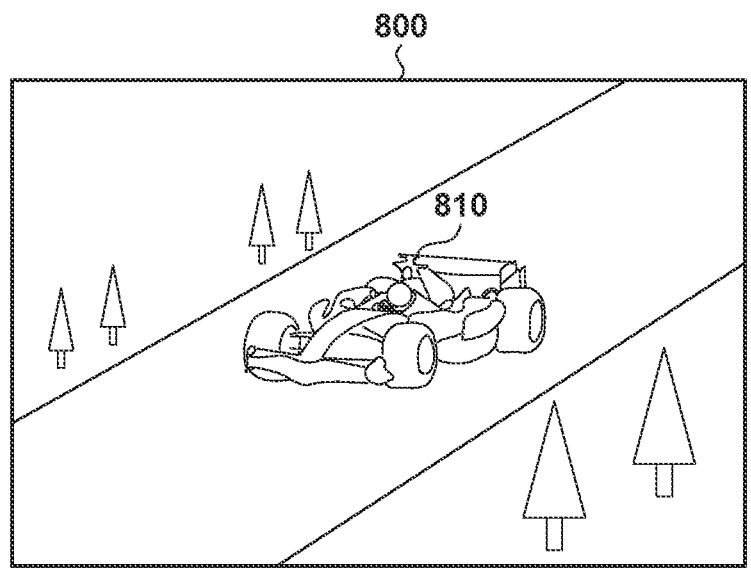
FIGS. 8A and 8B are views showing examples of an input image and an object candidate detection result.
Figure 8B:
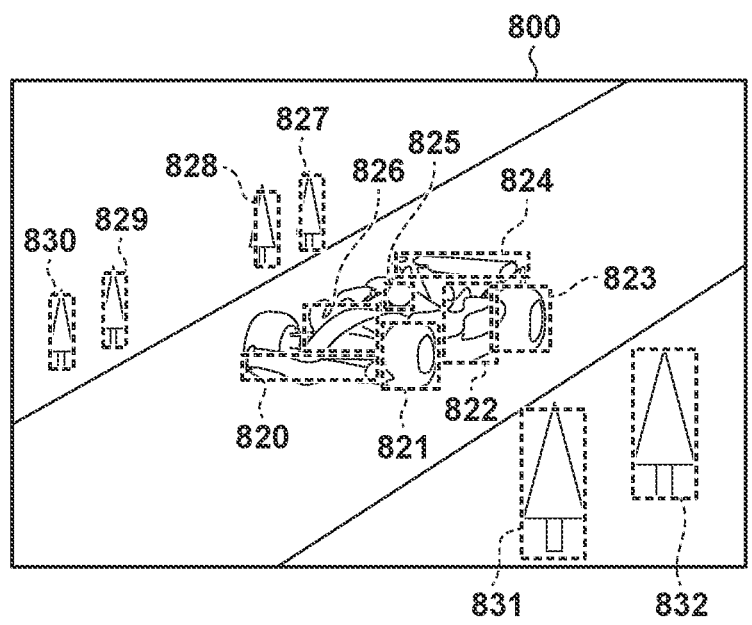

FIGS. 8A and 8B are views showing examples of the input image and the object candidate detection result. FIG. 8A shows an image 800 input by the image input unit 210 and displayed on the input/output apparatus 105. The image 800 includes a formula car 810 that is a nonspecific object candidate. FIG. 8B shows detection frames 820 to 832 corresponding to the object candidates detected by the detection unit 220 for the image 800.

In this embodiment, object candidate detection is implemented using a neural network. FIG. 4 is a view for explaining the structure of a neural network. The neural network has a network structure used in object detection described in any one of non-patent literatures 1 to 3. Such a network outputs an intermediate feature amount when an image is input to a network called a backbone. The feature amount obtained via the backbone is input to networks divided into tasks for estimating the object position and the object frame of an object (a vehicle, an animal, or the like), respectively. In the network shown in FIG. 4, a "center map" representing the center position of each object and two "size maps" representing the width and the height of each frame (object frame) surrounding an object are obtained. Each map is a two-dimensional array and is expressed by a grid. In the center map, a likelihood representing the likelihood of the center position of an object in the array is inferred.

Figure 15A:
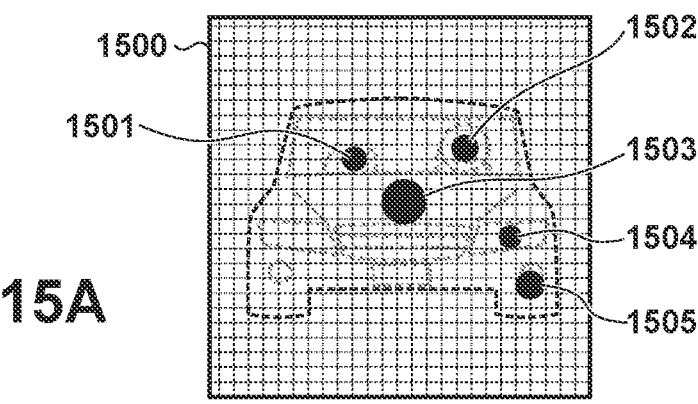
FIGS. 15A to 15C are views showing examples of a center map and size maps.
Figure 15B:
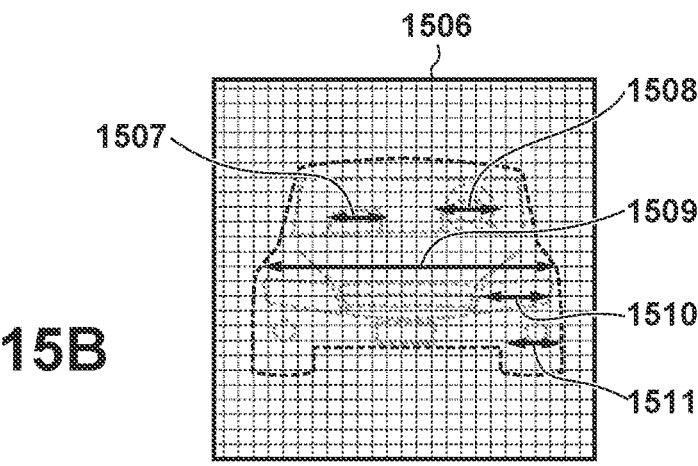
Figure 15C:
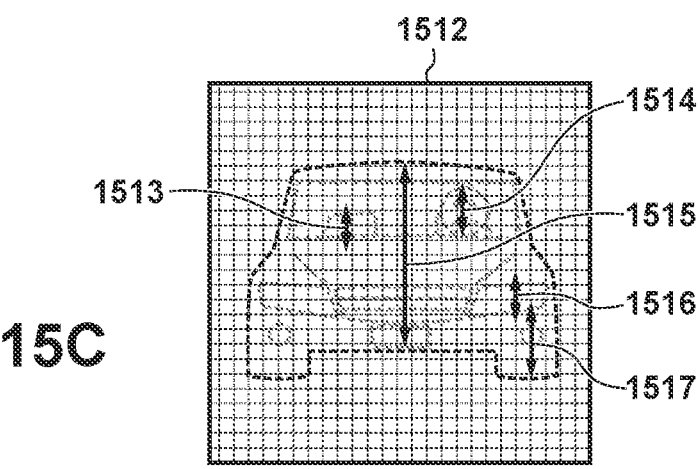

FIGS. 15A to 15C are views showing examples of the center map and the size maps. FIG. 15A shows a center map 1500. In the center map 1500, the magnitudes of the likelihoods of a chair, a person face, a car, a light, and a tire are represented by black dots 1501 to 1505. FIG. 15B shows a size map 1506 representing the width (the size in the horizontal direction) of each object. In the size map 1506, the widths of the chair, the person face, the car, the light, and the tire are represented by two-headed arrows 1507 to 1511. FIG. 15C shows a size map 1512 representing the height (the size in the vertical direction) of each object. In the size map 1512, the heights of the chair, the person face, the car, the light, and the tire are represented by two-headed arrows 1513 to 1517.

The center map indicates that the shorter the distance to the center of a black dot is, the higher the likelihood of a corresponding object (and its portion) is. The size maps include two maps for the width and the height. A position is defined as the center of an object (and its portion), and the width and the height of the object are inferred. The size map expresses the magnitude of a value by the length of a two-headed arrow, and shows that values representing the width and the height are inferred at the center position of each object (and its portion).

An object frame is defined by the center coordinates, the width, and the height of a rectangle surrounding an object in the image. In the center map, a likelihood representing the likelihood of the center position of each object is estimated. A threshold is set in advance for the likelihood, thereby acquiring an element having a value more than the threshold as a center position candidate of the object. If a center position candidate is obtained for each of a plurality of adjacent elements, an element having a higher likelihood is defined as the center position of the object. The resolution of the center map is lower than the resolution of the original image. For this reason, when the center position obtained in the center map is scaled to the image size, an object center position on the image is obtained. In addition, the width and the height of the frame surrounding the object can be obtained from the element in the size map corresponding to the detected object center position, thereby acquiring an object frame (detection frame).

In step S402, the selection unit 230 determines, in accordance with a control signal from the control apparatus 106, whether a tracking template is already set. The tracking template indicates an object frame used for tracking processing. The method of tracking processing will be described later. If it is not determined in step S402 that a tracking template is already set, the process advances to step S403. If it is determined in step S402 that a tracking template is already set, the process skips step S405 and advances from step S403 to step S406.

Figure 5:
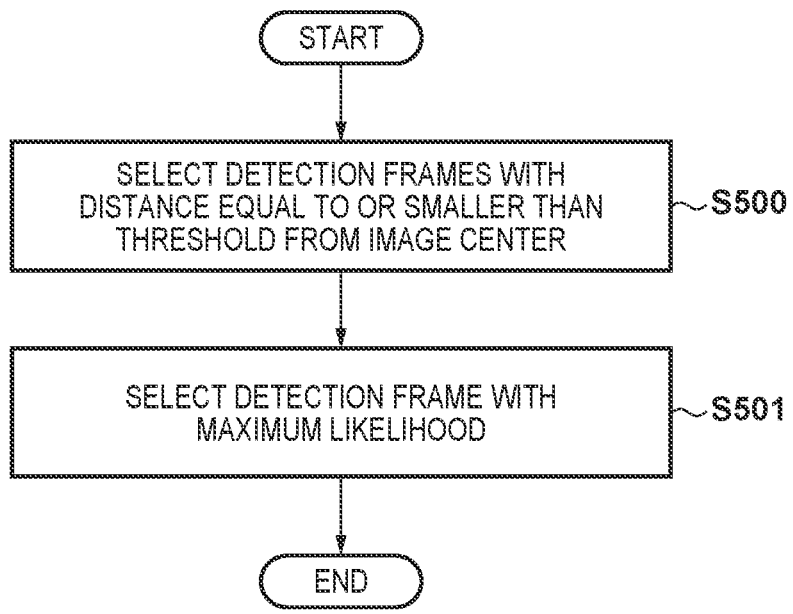
FIG. 5 is a detailed flowchart of first detection frame selection (step S403)

In step S403, the selection unit 230 selects one detection result from the object candidates detected by the detection unit 220. Here, the detection result means the detection frame obtained in step S401. To improve the visibility of the objects and detection frames in the image, in step S403, a detection frame to be displayed on the input/output apparatus 105 is selected from the detection frames 820 to 832. FIG. 5 is a detailed flowchart of first detection frame selection (step S403).

In step S500, in accordance with a control signal from the control apparatus 106, the selection unit 230 selects, for the object positions of the object candidates obtained by the detection unit 220, only detection frames whose distances from the image center are equal to or less than a threshold set in advance. Object candidates near the image center are selected to automatically select the object candidates only by framing of the camera system without a user input operation. In step S501, the selection unit 230 selects, from the one or more detection frames selected in step S500, one detection frame having the maximum likelihood in the center map, and initially sets it as a tracking template (initial region of interest).

Figure 9:
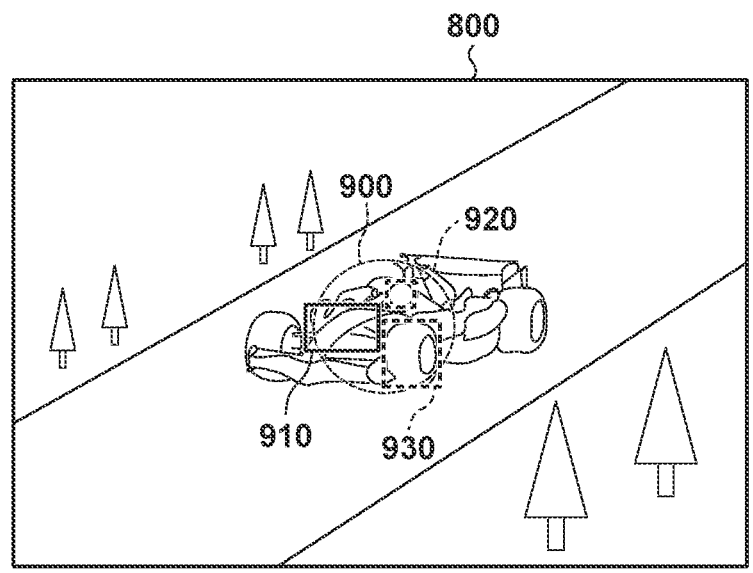
FIG. 9 is a view showing an example of the result of first detection frame selection.

FIG. 9 is a view showing an example of the result of first detection frame selection. A broken line circle 900 represents the distance threshold from the image center. A detection frame 910 indicates a detection frame selected by the above-described selection method, whose likelihood is maximum and whose distance from the image center is equal to or less than the threshold. Also, frames 930 and 920 are detection frames that are not selected by the above-described selection method (that is, detection frames whose distances from the image center are equal to or less than the threshold and whose likelihoods are not maximum). Note that one detection frame may be selected not by the above-described selection method but based on a selection instruction from the user. In general, the tracking template is preferably a frame surrounding a whole object capable of exhibiting the feature of the object. However, the detection frame 910 with the maximum likelihood corresponds to a part of the body of the formula car 810 and, therefore, is not suitable as the tracking template. Hence, the tracking template is corrected in steps S407 to S415 to be described late.

In step S404, the selection unit 230 determines, in accordance with a control signal from the control apparatus 106, whether there is a selected detection frame. FIG. 9 shows a case where object candidates exist. However, detection frames may be absent if an image including only a background or an even image is input. If it is determined that a selected detection frame exists, the process advances to step S405. If it is not determined that a selected detection frame exists, the process skips step S405 and advances to step S406. In step S405, the selection unit 230 sets the selected detection frame to the tracking template.

In step S406, the operation acquisition unit 260 determines whether a user input to the image displayed on the input/output apparatus 105 by the image display unit 250 is detected. More specifically, input operation information by the user is acquired from the control apparatus 106, and it is determined whether touch down is detected. If it is not determined that touch down has occurred, the process skips steps S407 to S415 and advances to step S416. If it is determined that touch down has occurred, the process advances to step S407.

In step S407, the operation acquisition unit 260 stores, in the RAM 102, the image obtained by the image input unit 210 and the detection frame obtained by the detection unit 220. In step S408, the image display unit 250 displays the image stored in step S407 on the input/output apparatus 105. Note that if the moving image obtained from the image input unit is directly displayed on the image display unit 250, the tracking target object moves, and it is difficult for the user to select the tracking target object. Hence, control is preferably performed to store the image at the timing of touch down detection (touch start) and keep the image displayed as a still image. This allows the user to easily select the tracking target object or input a locus to be described later.

In step S409, the operation acquisition unit 260 determines, in accordance with a control signal from the control apparatus 106, whether the end of user input is detected. More specifically, it is determined whether touch up is detected. If touch up is not detected, the image stored in step S407 is continuously displayed on the input/output apparatus 105. If touch up is detected in step S409, the process advances to step S410. In step S410, the operation acquisition unit 260 generates a frame surrounding the user input. In this embodiment, the user input is information including a series of coordinates (locus) input by the user by touch move. A frame surrounding a user input (a rectangular region including a whole locus) will be referred to as a locus frame hereinafter. Also, a region in the locus frame will be referred to as a locus region.

Figure 10A:
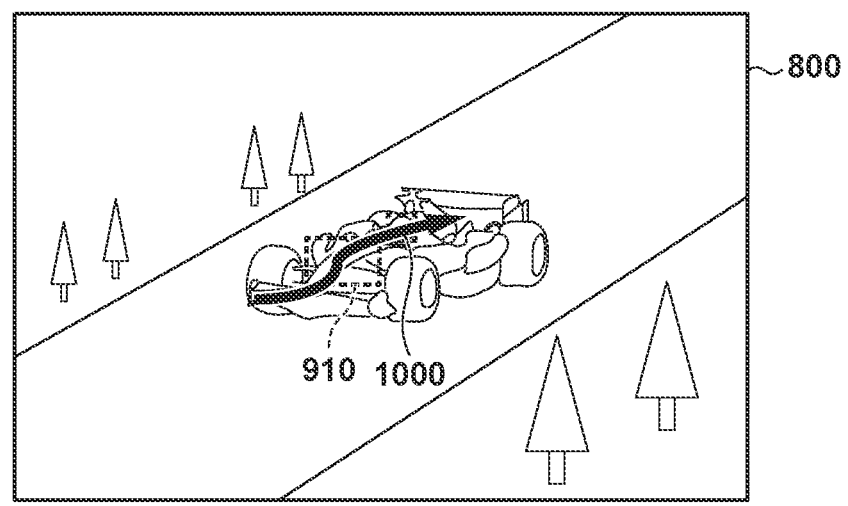
FIGS. 10A to 10C are views for explaining setting of a locus frame based on the locus of a user input.
Figure 10B:
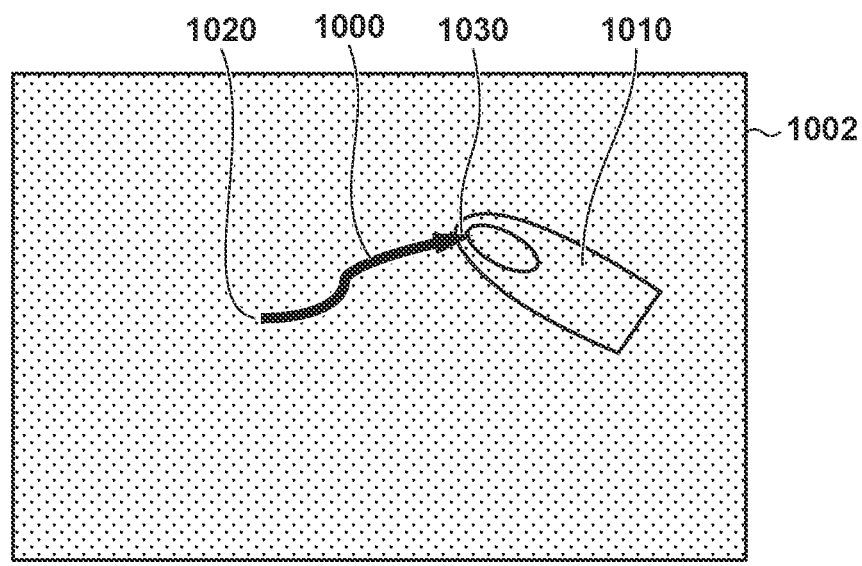
Figure 10C:
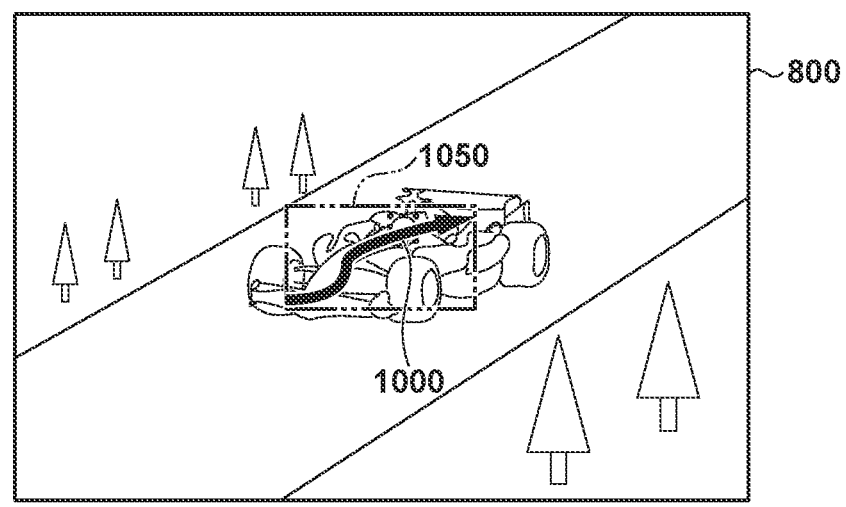

FIGS. 10A to 10C are views for explaining setting of a locus frame based on the locus of a user input. In FIG. 10A, an arrow 1000 imitates a locus that the user inputs by touch move. FIG. 10B shows a touch panel 1002 of the input/output apparatus 105, and a finger 1010. A position 1020 is the position of touch down, and a position 1030 is the position of touch up. FIG. 10C shows a locus frame 1050.

As shown in FIG. 10B, the user makes the finger 1010 touch down at the position 1020 on the touch panel, moves to the position 1030 by touch move, and performs touch up at the position 1030. The operation acquisition unit 260 generates the locus frame 1050 surrounding the locus 1000 input by the user, as shown in FIG. 10C. Note that the locus frame need not be a frame surrounding the whole locus, and the coordinate position or size of the locus may be corrected assuming a user's intention or an input error. For example, the coordinates of the locus itself may be used. A region of an arbitrary shape surrounded by touch move, as will be described later, may be set to the locus.

Figure 16A:
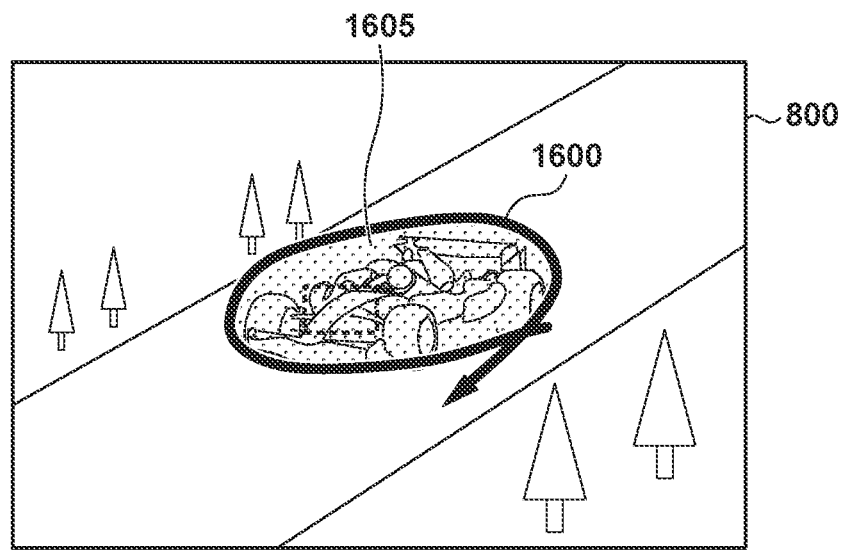
FIGS. 16A and 16B are views for explaining another example of setting of the locus frame based on the locus of the user input.
Figure 16B:
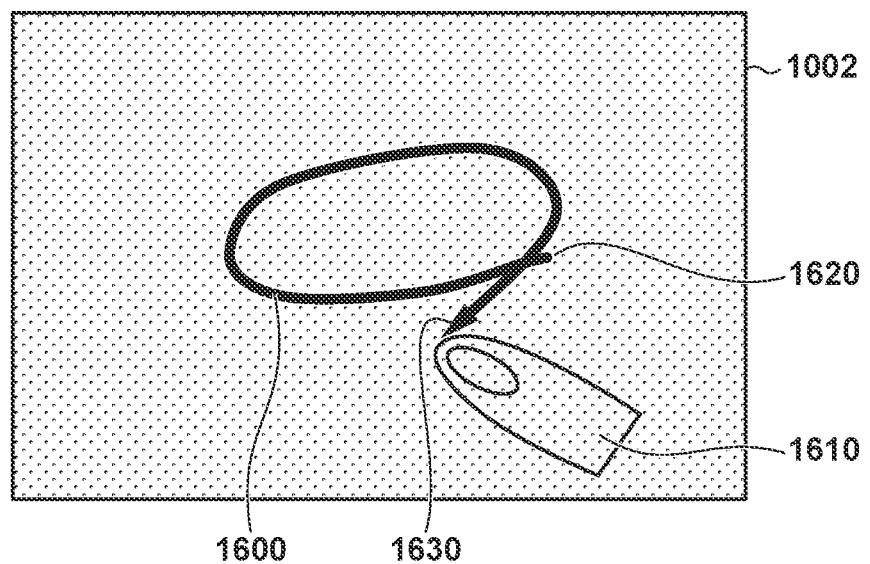

FIGS. 16A and 16B are views for explaining another example of setting of the locus frame based on the locus of the user input. Referring to FIG. 16A, an arrow locus 1600 imitates a locus that the user inputs by touch move, and a locus region 1605 is a region surrounded by the locus input by touch move. FIG. 16B shows a finger 1610, a position 1620 of touch down, and a position 1630 of touch up. As shown in FIG. 16B, the user makes the finger 1610 touch down at the position 1620 on the touch panel, moves to the position 1630 by touch move, and performs touch up at the position 1630. If the control apparatus 106 determines that the locus of touch move is closed, processing similar to processing for a locus frame to be described later is executed for the inside of the closed region.

Figure 6:
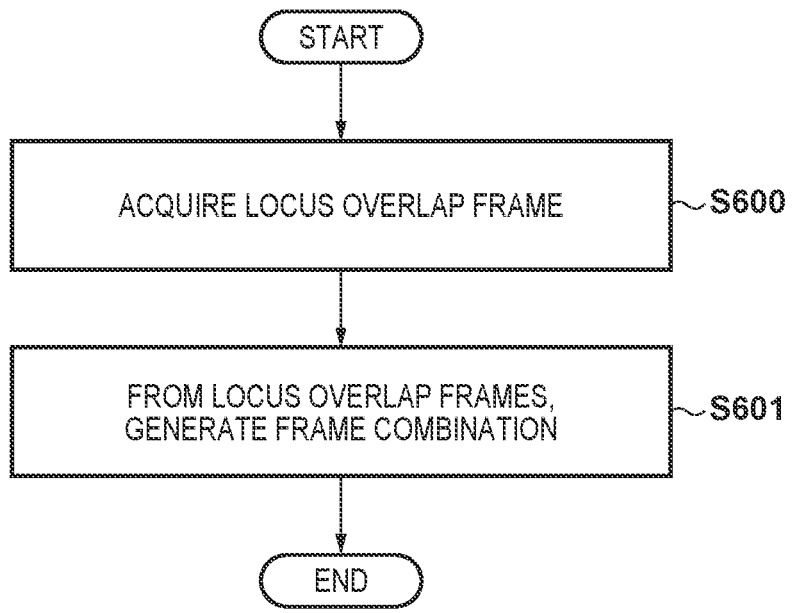
FIG. 6 is a detailed flowchart of second detection frame selection (step S411)

In step S411, the selection unit 270 selects a combination of object candidates from the object candidates detected by the detection unit 220 and the information acquired by the operation acquisition unit 260. The combination of object candidates includes two or more object candidates. FIG. 6 is a detailed flowchart of second detection frame selection (step S411).

In step S600, in accordance with a control signal from the control apparatus 106, the selection unit 270 acquires, from the detection frames detected by the detection unit 220, two or more detection frames (to be referred to as locus overlap frames) in which the locus acquired by the operation acquisition unit 260 has overlap portions. For example, it is determined whether the coordinates of the locus on the image and the coordinates of the region of each detection frame overlap.

In step S601, the selection unit 270 generates a combination of detection frames from one or more locus overlap frames obtained in step S600. All combinations are generated as the combinations. However, to speed up processing, frames whose likelihoods are equal to or less than a threshold set in advance may be excluded from the locus overlap frames.

Figure 11A:
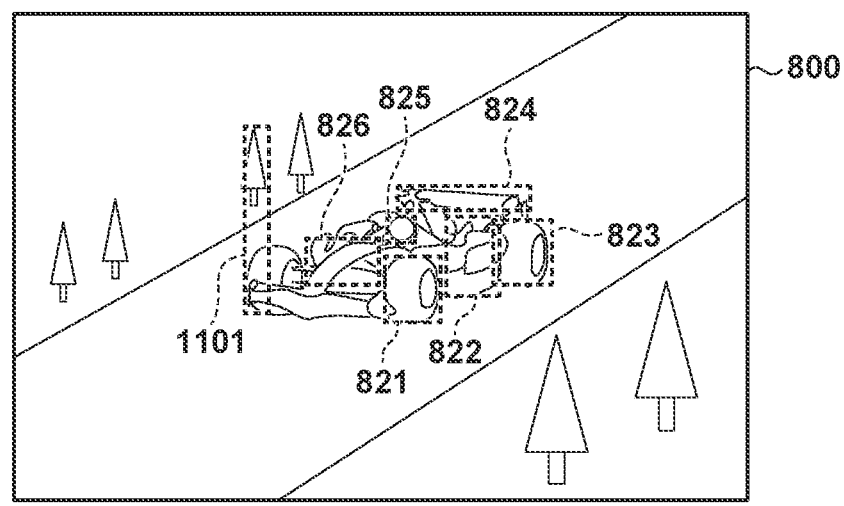
FIGS. 11A and 11B are views showing examples of generation of frame combinations.
Figure 11B:
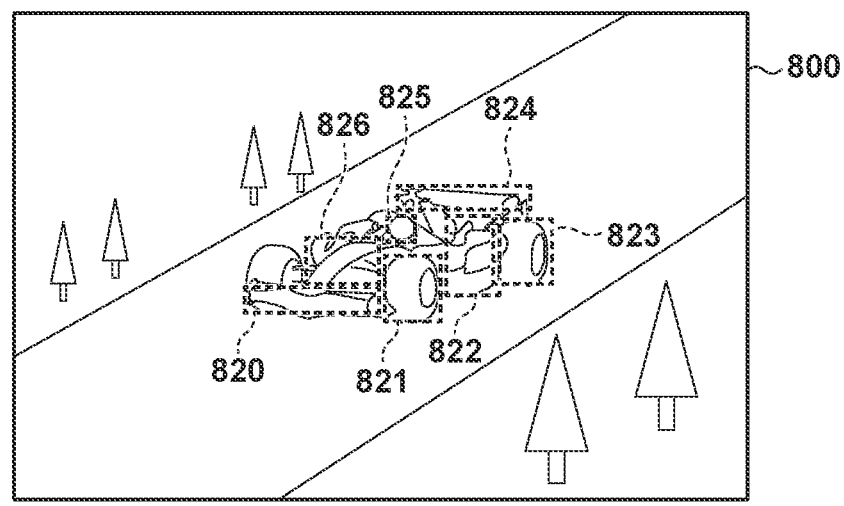

FIGS. 11A and 11B are views showing examples of generation of frame combinations. FIG. 11A shows an example in which, of the detection frames detected in step S401, which are shown in FIG. 8B, the detection frames 821 to 826 and 828 are selected and combined. FIG. 11B shows an example in which the detection frames 820 to 826 are selected and combined.

In step S412, the integration unit 280 integrates the plurality of detection frames into one frame based on the combination of locus overlap frames selected by the selection unit 270. In this embodiment, a rectangular frame (to be referred to as an integration frame) surrounding the whole region of the locus overlap frames is generated. Also, a region in the integration frame will be referred to as an integration region.

Figure 12A:
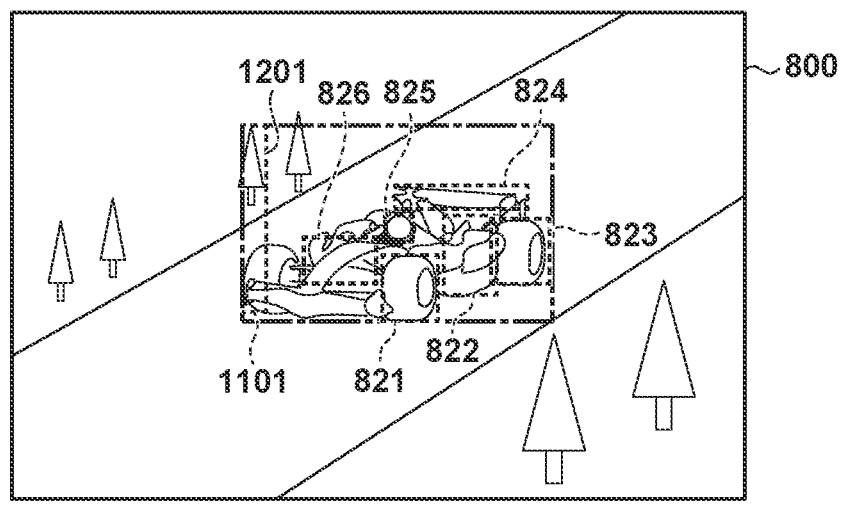
FIGS. 12A and 12B are views showing examples of generation of integration frames.
Figure 12B:
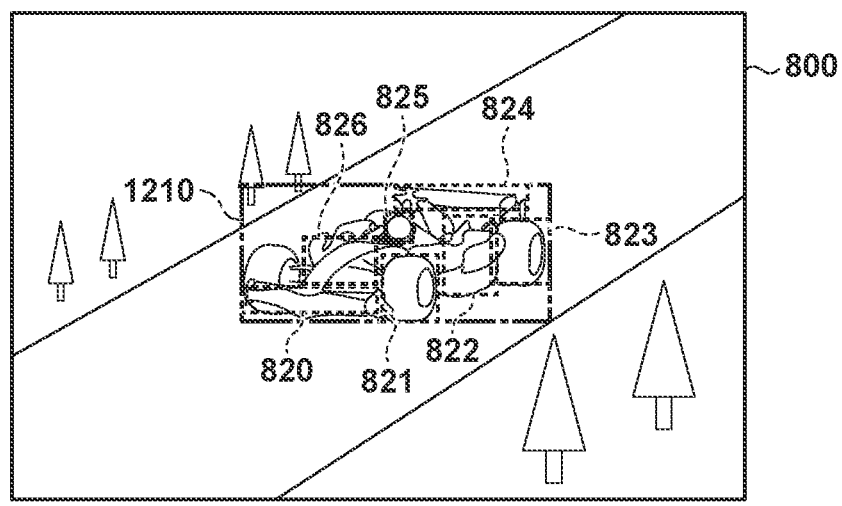

FIGS. 12A and 12B are views showing examples of generation of integration frames. Referring to FIG. 12A, a frame 1201 is an integration frame in the combination example shown in FIG. 11A. Referring to FIG. 12B, a frame 1210 is an integration frame in the combination example shown in FIG. 11B. For example, the minimum x- and y-coordinates and the maximum x- and y-coordinates on the image coordinates of the locus overlap frames included in the combination are calculated, and an integration frame is generated based on the calculated coordinates.

Figure 7:
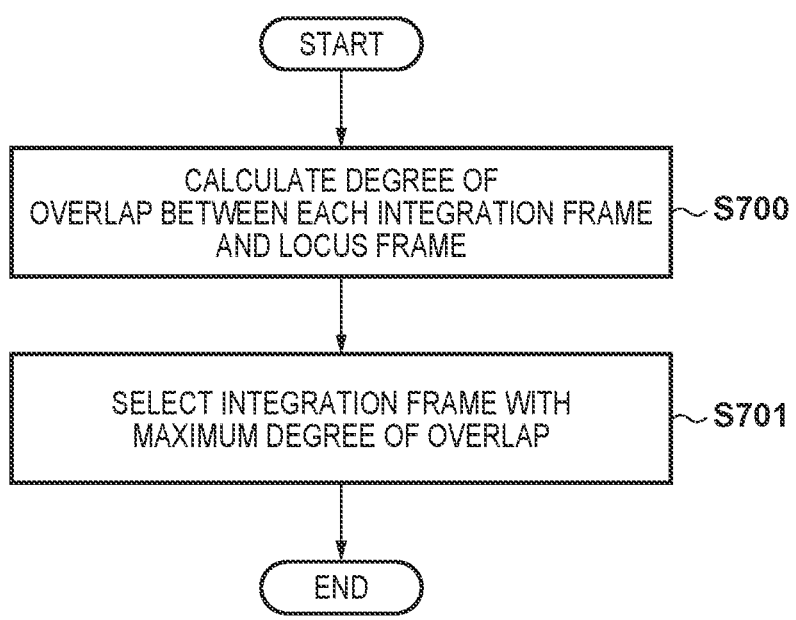
FIG. 7 is a detailed flowchart of integration frame selection (step S413)

In step S413, the selection unit 285 selects one integration frame from the integration results obtained by the integration unit 280. FIG. 7 is a detailed flowchart of integration frame selection (step S413).

In step S700, the selection unit 285 calculates the degree of overlap between the locus frame generated in step S410 and each of the plurality of integration frames generated in step S412. As the degree of overlap, for example, the ratio (IoU: Intersection over Union) of the area of the intersection (overlap region) between the two regions of interest to the area of the union of two regions is calculated.

Figure 13A:
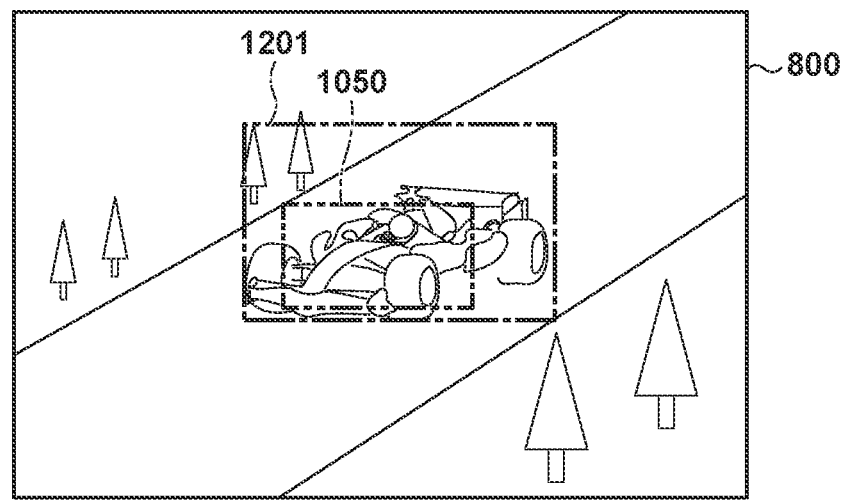
FIGS. 13A and 13B are views for explaining the degree of overlap between the integration frame and a locus frame.
Figure 13B:
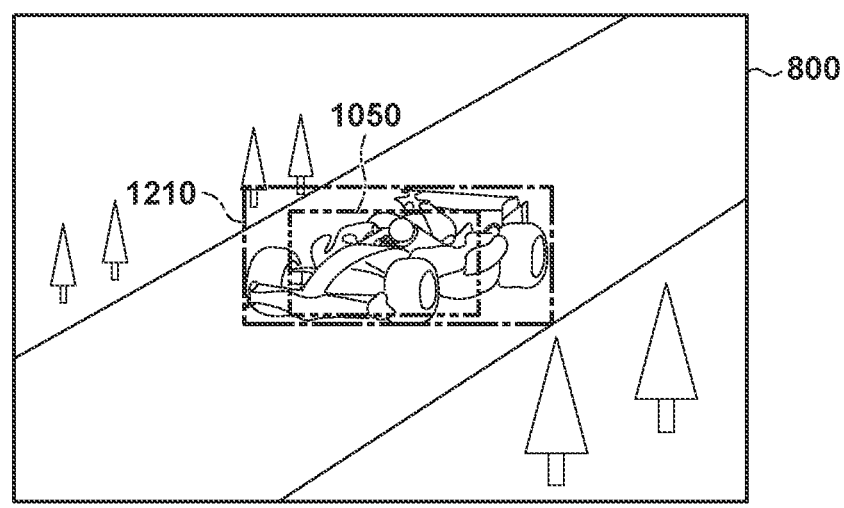

FIGS. 13A and 13B are views for explaining the degree of overlap between the integration frame and the locus frame. Referring to FIG. 13A, the frame 1201 is the integration frame in the combination example shown in FIG. 12A, and the frame 1050 is the locus frame generated in FIG. 10C. Referring to FIG. 13B, the frame 1210 is the integration frame in the combination example shown in FIG. 12B, and the frame 1050 is the locus frame generated in FIG. 10C.

In step S701, the selection unit 285 selects an integration frame whose IoU as the degree of overlap is maximum. For example, since the degree of overlap between the integration frame and the locus frame in FIG. 13B is larger than the degree of overlap between the integration frame and the locus frame in FIG. 13A, the integration frame shown in FIG. 13B is selected. Also, a threshold may be set in advance, and if the IoU does not exceeds the threshold, selection of the frame may be inhibited, thereby preventing the user from selecting an unintended frame.

In step S414, the superimposition unit 240 determines, in accordance with a control signal from the control apparatus 106, whether a selected integration frame exists. If it is determined that a selected integration frame exists, the process advances to step S415. If it is not determined that a selected integration frame exists, the process skips step S415 and advances to step S416. In step S415, the selection unit 285 updates the selected integration frame as the tracking template.

In step S416, the image display unit 250 displays a superimposed image on the input/output apparatus 105. More specifically, the image input by the image input unit 210 in step S400, the detection frame selected by the selection unit 230 in step S403, the integration frame selected in step S413, and a frame that has undergone tracking processing in step S418 to be described later are displayed in a superimposed manner. Note that if the frames are selected in both steps S403 and S413, the integration frame selected in step S413 is preferably preferentially displayed. If the integration frame is selected in step S413, and tracking processing is executed in the preceding frame in step S418 to be described later, the integration frame selected in step S413 is preferably preferentially displayed.

In step S417, the tracking unit 290 determines, in accordance with a control signal from the control apparatus 106, whether a tracking template is set. If it is determined in step S417 that a tracking template is set, the process advances to step S418. If it is not determined in step S417 that a tracking template is set, the process skips steps S418 and S419 and advances to step S420.

In step S418, the tracking unit 290 executes tracking processing based on the image obtained by the image display unit 250 and the object candidates. As the tracking processing method, template matching is applied, and a region with high similarity to the template is searched for. For example, a method described in Japanese Patent Laid-Open No. 2020-21250 (patent literature 2) can be used.

In step S419, in accordance with a control signal from the control apparatus 106, the tracking unit 290 executes AF processing for the region tracked by the tracking unit 290. As the AF processing method, AF of a phase difference detection method described in patent literature 2 can be used.

In step S420, the tracking unit 290 determines in accordance with a control signal from the control apparatus 106 whether to continue the tracking processing. If it is determined to continue the tracking processing, the process returns to step S400.

Note that in the above description, object candidate detection is executed using a frame having a rectangular shape to obtain a tracking template. Object candidate detection may be executed using not a frame having a rectangular shape but a region having an arbitrary shape to obtain a tracking template.

As described above, according to the first embodiment, the tracking template (the region of interest corresponding to the tracking target object) is set using the detection frame set by the detection unit and the locus of the touch operation of the user. In particular, the user can correct the tracking template to a more appropriately size only by performing a simple operation (touch operation) for the detection frame.

(First Modification)

In the above-described first embodiment, in second detection frame selection (step S411), integration frames are generated for all frame combinations in locus overlap frames. However, if the integration frames are generated for all frame combinations, high calculation cost is generated, including subsequent calculation of the degrees of overlap for the locus frame. In addition, similar integration frames are often generated, and it can be said that the processing is redundant.

Furthermore, if an object located on the near side with respect to the image capturing apparatus 101 and an object on the far side are close to each other on the image (if the objects are apart on the z-coordinates (in the depth direction) but close on the x- and y-coordinates of the image), inappropriate frames may be integrated. In the first modification, an example in which the selection unit 270 generates a frame combination using distance information on the z-coordinates (in the depth direction) of frames will be described.

In the first modification, as a distance information acquisition method, a method of calculating distance information from a parallax image is applied. For example, a method described in Japanese Patent Laid-Open No. 2019-126091 (patent literature 3) can be used. A parallax image obtained by the image capturing apparatus 101 is accumulated in the RAM 102. The control apparatus 106 calculates distance information (depth information) based on the parallax image and uses it as information to generate a frame combination. The distance information (depth information) may be acquired by another method, as a matter of course.

FIG. 14 is a flowchart for explaining processing of the selection unit 270 according to the first modification. Note that step numbers are added in correspondence with the flowchart of the first embodiment shown in FIG. 6. Steps S1400 and S1401 are the same processes as steps S600 and S601 in FIG. 6.

In step S1402, in accordance with a control signal from the control apparatus 106, the selection unit 270 acquires, from the RAM 102, the distance information of the region in a locus overlap frame detected by the detection unit 220. For example, the distance information at the center position with the highest likelihood is used. Alternatively, the average value of distance information in the region or the average value of distance information multiplied by the likelihoods may be used.

In step S1403, the selection unit 270 calculates the distance information difference between the locus overlap frames. For example, in FIG. 8B, if the detection frames 820, 821, and 831 are locus overlap frames, the distance between the detection frame 820 and the detection frame 821 is short, and the distance between the detection frame 820 and the detection frame 831 or the distance between the detection frame 821 and the detection frame 831 is long.

In step S1404, the selection unit 270 excludes, from combinations, a frame for which the difference from the average value of the distances between the locus overlap frames is equal to or more than a predetermined threshold. Here, the detection frame 831 is excluded from the combinations generated in step S1401. This is because pieces of distance information of locus overlap frames corresponding to the tracking target object (one object) can be assumed to be similar, and a locus overlap frame whose distance information is not similar can be assumed to be another object. Note that not the average value of the distance information of the locus overlap frames but the distance information of the locus overlap frame with the highest likelihood may be considered as reference distance information, and a frame for which the difference from the reference distance information is equal to or more than a threshold set in advance may be excluded from combinations.

As described above, in the first modification, of the plurality of locus overlap frames, a locus overlap frame for which the difference from the average value of distances is equal to or more than the threshold set in advance is excluded. This can decrease the number of frame combinations and reduce the calculation cost.

(Second Modification)

In the first embodiment, first, a tracking template based on one detection frame selected near the center portion of the image is set as an initial template (steps S402 to S405). After that, if a tracking template based on an integration frame generated based on a user input is set (steps S406 to S415), the tracking template based on the integration frame is used. However, setting of the tracking template in steps S402 to S405 may not be performed. That is, the tracking template based on the integration frame generated based on the user input may be set as the initial template.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-142699, filed Sep. 1, 2021 which is hereby incorporated by reference herein in its entirety.

What is claimed is:

1. An image processing apparatus comprising:
at least one processor; and
at least one memory having stored thereon instructions which, when executed by the at least one processor, cause the image processing apparatus at least to:
input an image;
detect an object from the image;
based on a selection instruction from a user, select one detection frame of an object, among a plurality of objects detected, and set the detection frame as an initial region of interest in the image;
accept an input of a locus to the image;
select, based on a locus region decided by the locus, at least two objects included in the plurality of objects;
generate an integration region that integrates at least two regions in the image corresponding to the at least two objects selected; and
if the integration region is generated, update a region of interest in the image from the initial region of interest to the integration region.

2. The apparatus according to claim 1, wherein the instructions further cause the image processing apparatus to display the image on a touch display and accept the input of the locus to the image by a touch operation to the touch display.

3. An image processing apparatus comprising:
at least one processor; and
at least one memory having stored thereon instructions which, when executed by the at least one processor, cause the image processing apparatus at least to:
input an image;
detect an object from the image;
select one detection frame of an object, among a plurality of objects detected, whose distance from a center of the image is not more than a threshold set in advance and whose likelihood is maximum, and set the detection frame as an initial region of interest in the image;
accept an input of a locus to the image;
select, based on a locus region decided by the locus, at least two objects included in the plurality of objects;
generate an integration region that integrates at least two regions in the image corresponding to the at least two objects selected; and
if the integration region is generated, update a region of interest in the image from the initial region of interest to the integration region.

4. An image processing apparatus comprising:
at least one processor; and
at least one memory having stored thereon instructions which, when executed by the at least one processor, cause the image processing apparatus at least to:
input an image,
detect an object from the image,
accept an input of a locus to the image,
decide a plurality of combinations including at least two objects each including an overlap portion with the locus region of a plurality of objects detected,
select, among the plurality of combinations, one combination in which a ratio of an area of an intersection between the integration region and the locus region to an area of a union of the locus region and the integration region that integrates at least two regions corresponding to the at least two objects included in the combination is maximum,
select at least two objects included in the one selected combination,
generate an integration region that integrates at least two regions in the image corresponding to the at least two objects selected, and
set the integration region as a region of interest in the image.

5. The apparatus according to claim 4, wherein the instructions further cause the image processing apparatus to exclude, from the plurality of combinations, at least one combination including an object for which a difference from an average value of distance information corresponding to at least two objects included in the combination is not less than a predetermined threshold.

6. The apparatus according to claim 1, wherein the locus region is a rectangular region including the locus.

7. The apparatus according to claim 1, wherein the locus region is a region having an arbitrary shape surrounded by the locus.

8. An image capturing apparatus comprising:
a camera that performs image capturing to generate a moving image;
at least one processor; and
at least one memory having stored thereon instructions which, when executed by the at least one processor, cause the image processing apparatus at least to:
input an image included in the moving image;
detect an object from the image;
based on a selection instruction from a user, select one detection frame of an object, among a plurality of objects detected, and set the detection frame as an initial region of interest in the image;
accept an input of a locus to the image;
select, based on a locus region decided by the locus, at least two objects included in the plurality of objects;
generate an integration region that integrates at least two regions in the image corresponding to the at least two objects selected;
if the integration region is generated, update a region of interest in the image from the initial region of interest to the integration region; and
track an object included in the moving image in accordance with the region of interest.

9. A control method of an image processing apparatus for setting a region of interest in an image, comprising:
inputting the image;
detecting an object from the image;
based on a selection instruction from a user, selecting one detection frame of an object, among a plurality of objects detected, and setting the detection frame as an initial region of interest in the image;
accepting an input of a locus to the image;
selecting, based on a locus region decided by the locus, at least two objects included in the plurality of objects;
generating an integration region that integrates at least two regions in the image corresponding to the at least two objects selected; and if the integration region is generated, updating a region of interest in the image from the initial region of interest to the integration region.

10. A non-transitory computer-readable recording medium storing a program for causing a computer to execute a control method of an image processing apparatus for setting a region of interest in an image, the control method comprising:

inputting the image;

detecting an object from the image;

based on a selection instruction from a user, selecting one detection frame of an object, among a plurality of objects detected, and setting the detection frame as an initial region of interest in the image;

accepting an input of a locus to the image;

selecting, based on a locus region decided by the locus, at least two objects included in the plurality of objects;

generating an integration region that integrates at least two regions in the image corresponding to the at least two objects selected; and if the integration region is generated, updating a region of interest in the image from the initial region of interest to the integration region.

* * * * *